United States Patent [19]

Paynter et al.

[11] 3,867,280

[45] Feb. 18, 1975

[54] REFORMING WITH PT-IR CATALYSTS PROMOTED BY EITHER BI OR FE

[75] Inventors: John D. Paynter, Louisville, Ky.; William M. Bunting, Baton Rouge, La.

[73] Assignee: Exxon Research and Engineering Company, Linden, N.J.

[22] Filed: Aug. 16, 1973

[21] Appl. No.: 388,907

[52] U.S. Cl. ............... 208/139, 208/140, 252/441, 252/442, 252/466 PT
[51] Int. Cl. ............................................. C10g 35/08
[58] Field of Search ................... 208/138, 139, 140; 252/466 PT, 441, 442

[56] References Cited
UNITED STATES PATENTS

| | | | |
|---|---|---|---|
| 2,848,377 | 8/1958 | Webb | 208/138 |
| 2,906,702 | 9/1959 | Brennan et al. | 208/140 |
| 3,413,213 | 11/1968 | Hayes | 208/139 |
| 3,511,888 | 5/1970 | Jenkins | 208/138 |
| 3,554,902 | 1/1971 | Buss | 208/138 |
| 3,798,155 | 3/1974 | Wilhelm | 208/139 |

*Primary Examiner*—Herbert Levine
*Attorney, Agent, or Firm*—L. A. Proctor

[57] ABSTRACT

Process and composition for improving the octane quality of naphthas. An iridium-containing catalyst, particularly a catalyst of an admixture of platinum, iridium, and either iron or bismuth, or both, composited with a porous, inorganic oxide base, inclusive of halogen, is found especially useful in reforming particularly in redispersing agglomerated iridium in reactivation of the catalyst.

5 Claims, No Drawings

REFORMING WITH PT-IR CATALYSTS PROMOTED BY EITHER BI OR FE

Catalytic reforming, or hydroforming, is a process used for known to the petroleum refining industry and has been for improving the octane quality of naphthas and straight run gasolines for decades. In a typical process, a series of reactors are provided with fixed beds of catalysts, and each reactor is preceded by a reheat furnace. A naphtha feed, with hydrogen, is co-currently passed sequentially through a reheat furnace and then, downflow, to the preceding reactor of the series. The vapor effluent from the last reactor of the series is a gas rich in hydrogen, which usually contains small amounts of normally gaseous hydrocarbons, and it is separated from the $C_5^+$ liquid product and recycled to the process to inhibit coke formation on the catalyst, though overall there is net hydrogen production.

Reforming catalysts are recognized as dual-functional, the catalyst composite including a component comprising a metal, or metals, or a compound or compounds thereof, usually as oxides or sulfides, providing a hydrogenation-dehydrogenation function and a mildly acidic component providing an isomerization function. The principle reactions produced by dual functional reforming catalysts: (1) the dehydrogenation of naphthenes to produce the corresponding aromatic hydrocarbons, e.g., methylcyclohexane is dehydrogenated to form toluene, (2) isomerization of n-paraffins to form branched-chained paraffins and isomerization of ring compounds, e.g., the isomerization of ethylcyclopentane to form methylcyclohexane, and dehydrogenation of the latter to form toluene, (3) dehydrocyclization of paraffins to form aromatics, e.g., the dehydrocyclization of n-heptane to form toluene, and (4) hydrocracking of high molecular weight feed constituents to form lower molecular weight, or lower boiling constituents, e.g., the cracking of n-decane, to produce $C_3$ and $C_7$ hydrocarbons. The net effect of such reactions must be to increase the concentration of aromatics, with consequent octane improvement of naphthas boiling within the gasoline range.

Group VIII noble metals, i.e., platinum group metals (ruthenium, osmium, rhodium, iridium, palladium, and platinum), despite their expense, have long since been recognized as having a combination of properties which make them particularly suitable as hydrogenation-dehydrogenation components for reforming operations, and catalysts, utilizing platinum, have become widely used in commercial operations. Conventional reforming catalysts have thus long employed platinum composited with an inorganic oxide base, particularly alumina. More recently, due to environmental considerations which necessitate removal of lead from gasoline, other metals such as rhenium, germanium, tungsten, tin, lead, and Group III rare earth metals have been added to platinum as promoters to enhance one or more of certain of the characteristics which a good reforming catalyst must possess—viz., activity, selectivity, activity maintenance, and yield stability. Minor proportions of a halogen, e.g., chlorine, are generally added to supply the acid function required of such catalysts.

Iridium-containing catalysts, or catalysts comprising, e.g., composites of platinum and iridium with an inorganic oxide base, particularly alumina, were reported many years ago and are described in, e.g., U.S. Pat. No. 2,848,377. While such catalysts are significantly more active in the production of $C_5^+$ gasoline during reforming than a catalyst comprising platinum without iridium, the commercial application of such catalyst has lagged, and only recently has such catalyst been seriously considered for commercial use. Though the initial activity of these catalysts is generally high, and activity maintenance is excellent, a progressive and serious decline in activity does occur. There is a tendency of the iridium to form larger aggregates, or agglomerates, generally in admixture with iridium oxide. As the size of the agglomerates increases, there results a progressive decline in catalyst activity.

X-ray diffraction patterns taken, e.g., on fresh, or carefully regenerated, platinum-iridium catalysts thus fails to show any significant lines corresponding to platinum, or iridium, thus indicating that platinum and iridium are present in very finely dispersed atomic forms. X-ray diffraction patterns taken on the same catalyst used in reforming, from which the coke has been burned, shows the presence behavior platinum and iridium, as agglomerates or relatively large or massive crystals with crystal diameters in excess of about 50A (Angstrom units) and even 150A, and greater. The crystallite size of the platinum is sharply contrasted with the state of dispersion of the platinum on fresh catalysts which is shown by carbon monoxide chemisorption techniques to range in average size to a maximum of about 11 or 12A. (See *J. of Catalysis*, 8 348,1967 by D. J. C. Yates and J. H. Sinfelt.) Iridium metal not only exhibits similar behavior but, additionally, especially in the presence of oxygen at high temperature, possesses an acute tendency to agglomerate into large crystallites which contain iridium oxide in admixture with the agglomerated metal. The activity of such catalysts is substantially lowered as a result of the loss of metal dispersion on the catalytic surface.

Satisfactory techniques have only recently been discovered for redispersing iridium and iridium oxide containing agglomerates. In accordance with these procedures, it has been found that the agglomerates of iridium-containing catalysts can be redispersed, and the deactivated catalyst thereby reactivated, by sequential (a) prereduction, preferably with hydrogen, (b) with subsequent contact of the reduced catalyst with halogen, or halogen-containing gaseous mixtures, e.g., chlorine or chlorine-containing gaseous mixtures, which may or may not contain oxygen. Of the techniques described, multiple cycle treatments of (a) prereduction, and (b) halogen contacts are more preferred in reactivation of the iridium-containing deactivated catalysts. Whereas these techniques have proven effective in redispersing iridium agglomerates, particularly the multiple cycle treatments which can, in varying degrees of effectiveness, completely redisperse the iridium agglomerates.

The present invention embodies a process for improving the octane quality of naphtha by contacting said naphtha, at reforming conditions, with a highly active catalyst composite, and the catalyst composite itself which includes a porous inorganic oxide support and catalytically active amounts of iridium, particularly platinum, and iridium, promoted with iron or bismuth, or both. Suitably, the composition is comprised of from about 0.05 to about 3 weight percent, preferably from about 0.1 to about 0.6 weight percent, platinum, from about 0.05 to about 3 weight percent, preferably from about 0.15 to about 0.3 weight percent iridium, and from about 0.05 to about 5 weight percent, preferably from about 0.5 to about 2 weight percent, of iron or bismuth. Suitably also, the composite includes from about 0.1 to about 2 weight percent, and preferably from about 0.6 to about 1.5 weight percent, of a halogen, e.g., chlorine, bromine, fluorine, and the like, of which chlorine is preferred. These metal hydrogenation-dehydrogenation components are generally present in the composite as a compound, or compounds, of the metal, or metals, generally as an oxide, halide or sulfide, or mixtures thereof. The composition can also include additional metals, or compounds of metals, as hydrogenation-dehydrogenation components, e.g., palladium, rhodium, osmium and the like, provided they are not contained in concentration sufficient to substantially decrease the normal catalytic effect of the admixture of platinum, iridium and iron or bismuth.

The reason for the effectiveness of iron and bismuth in "promoting" such catalysts is not completely understood, but halide-containing platinum-iridium catalysts promoted in such manner possess increased resistance to agglomeration and, if agglomerated, the agglomerates are more readily redispersed by conventional redispersion techniques. It is believed that iron and bismuth, at redispersion conditions, combine with the halide, e.g., chlorine, and provide a chloronium ion which reacts with iridium oxide, $IrO_2$, to form $IrO_2Cl$, which is more readily redispersed than $IrO_2$ which is especially inert to redispersion. Another theory, however, is that the iron acts as a "getter" and suppresses the formation ab initio of iridium oxide agglomerates. Iron, in any event, whether it acts as a promoter or inhibitor, is particularly suitable, and is preferred because not only does it aid in redispersion but also the activity of the iron-containing platinum-iridium catalyst is increased as contrasted with the non-iron containing platinum-iridium catalyst and, in addition $C_5^+$ liquid yield, activity maintenance and octane yield relationships are not significantly adversely affected, if at all.

In the practice of this invention, suitably, the metal hydrogenation-dehydrogenation components are composited with mildly or moderately acidic refractory inorganic oxides which are employed as supports, e.g., silica, silica-alumina, magnesia, thoria, boria, titania, zirconia, various spinels and the like, including in particular alumina which is preferred. High surface area catalysts, or catalysts having surface areas ranging upwardly from about 100 square meters per gram are preferred. In particular, catalysts having surface areas ranging from about 160 to about 250 square meters per gram prove quite satisfactory.

In formation of the more active catalysts, porous refractory inorganic oxides of desired particle size distribution, in dry state, can be contacted, admixed, or otherwise incorporated with a metal-containing solution, or solutions, and thereby impregnated. The refractory inorganic oxide can thus be pilled, pelleted, beaded, or extruded, alone or in admixture with other materials, and dried and crushed to form particles of desired size ranging, e.g., from about 0.02 to about 0.4 inches, and preferably from about 0.05 to about 0.2, average diameter. The material can then be treated by contact with a solution containing desired amounts of platinum, iridium and iron or bismuth, or treated sequentially by contact with a solution containing one metal and then another in the desired amounts. On the other hand, larger particles can be so treated and then crushed to the desired size. The particulate mass, in either instance, can be dried, calcined, and contacted with hydrogen, in situ or ex situ, to reduce the salt. Suitably, also, the catalyst composite can be formed by adding together suitable reagents such as salts of platinum, iridium, iron or bismuth, and ammonium hydroxide or ammonium carbonate, and a salt of alumina such as aluminum chloride or aluminum sulfate to form aluminum hydroxide. The aluminum hydroxide containing the salts of platinum, iridium, and iron or bismuth can then be heated, dried, and simultaneously converted to alumina, impregnated with platinum, iridium, and iron or bismuth salts. The material can then be calcined and then hydrogen-treated, in situ or ex situ, to reduce the salts and complete the formation of the catalyst composite.

Essentially any hydrocarbon fraction containing paraffins, naphthenes, and the like, can be converted by means of the catalysts of this invention. A suitable feed, e.g., either virgin or cracked, Fischer-Tropsch or mixtures thereof, is contacted at reforming conditions in the presence of hydrogen (once-through, or recycle) with a catalyst composite including a support which contains catalytically active amounts of the metals. Typical feed stream hydrocarbon molecules are those containing from about 5 to about 12 carbon atoms, or more preferably from about 7 to about 9 carbon atoms. Naphthas, or petroleum fractions boiling within the range of from about 80° F. to about 450° F., and preferably from about 125° F. to about 375° F., contain hydrocarbons or carbon numbers within these ranges. Typical fractions thus usually contain from about 20 to about 80 vol. % of paraffins, both normal and branched, which fall in the range of about $C_5$ to $C_{12}$, from about 20 to about 80 vol. % of naphthenes boiling within the range of about $C_6$ to $C_{12}$, and about 5 through 20 vol. % of the desirable aromatics boiling within the range of about $C_6$ to $C_{12}$.

Total cycle time is constituted of an on-oil portion and a regeneration portion of a cycle of operation. Regeneration and reactivation of the catalyst to maintain high catalytic activity is essential in the practice of this invention. In accordance with the present invention, therefore, deactivated catalyst is periodically reactivated. For example, in a reactor system wherein several reactors are in series, a single reactor is swung out of the series periodically, is regenerated and reactivated, and then put back in series, albeit all reactors of the series are not swung in and out of series with the same frequency. Thus, the catalyst in the end or tail reactors will generally be regenerated more frequently than catalyst in the front reactor, or reactors. For example, the front reactors may operate for several hundred hours before regeneration, whereas the tail reactor might only operate 20 to 100 hours before regeneration.

The exact time that a specific reactor can be used between regenerations is a function of many variables; for example, the particular concentrations of the hydrogenation-dehydrogenation component and halogen in the catalyst, the pressure, liquid hourly space velocity, temperature of the reforming process, and the like. It is generally preferred for reasons of economy to operate the reactors for as long a period as possible between regenerations without sacrificing substantial valuable $C_5^+$ liquid yield. Regeneration time is generally short in comparison to the overall reforming time.

The catalyst is regenerated by heating it in the presence of an oxygen-containing gas to burn coke off the catalyst. It is desirable to purge the reactor of hydrogen and naphtha before beginning the regeneration step. This can be accomplished by purging the reactor with an inert gas, e.g., flue gas. Oxygen is then generally added to the inert gas in limited amount. The oxygen in the regeneration gas should generally not exceed about 1 volume percent. Excess oxygen is avoided because this could cause a temperature run-away or excessive metals agglomeration. Preferably, the oxygen-containing gas is passed over the bed of catalyst at an initial temperature of about 700° F. to 850° F. to produce a flame front or combustion zone that travels through the catalyst bed. The amount of oxygen in the inert gas is controlled to prevent this flame front from exceeding about 950° F. and is preferably maintained at about 700° F. to 850° F.

After coke burn-off, the catalyst can be activated by treating it at elevated temperature with a halogen-containing gas. In the activation step, the catalyst, after it has been regenerated, is contacted and reacted with a halogen-containing gas at a temperature from about 500° F. to about 1,000° F. Halogen lost during reforming is restored in this step, and redispersion of the metal component, or components, of the catalyst is effected.

Following regeneration or activation, or both, of the catalyst, the system is purged with nitrogen or other inert gas to remove any oxygen present and then the catalyst is reduced with a hydrogen-containing gas. Thereafter, the catalyst is put on-oil, i.e., naphtha and hydrogen are contacted with the catalyst under reforming conditions.

During an on-oil portion of an operating cycle, reforming is conducted at temperatures ranging from about 600° to about 1,050° F., and preferably at temperatures ranging from about 850° to about 1,000° F. Pressures range generally from about 50 to about 750 psig., and preferably from about 100 to about 250 psig. The reactions are conducted in the presence of hydrogen to suppress side reactions normally leading to the formation of unsaturated carbonaceous residues, or coke, which causes deactivation of the catalyst. The hydrogen rate, once-through or recycle, is generally within the range of from about 1,000 to about 10,000 SCF/Bbl., and preferably within the range of from about 2,000 to about 5,000 SCF/Bbl. The feed stream, in admixture with hydrogen, is passed over the catalyst at space velocities ranging from about 0.1 to about 25 W/W/Hr., and preferably from about 1.0 to about 5.0 W/W/Hr.

The invention will be more fully understood by reference to the following selected non-limiting examples and comparative data which illustrate its more salient features. All parts are given in terms of weight except as otherwise specified.

In preparing for these demonstrations as described by reference to the examples below, a platinum-iridium catalyst is prepared by slurring 1 part of particulate alumina, 24 to 35 mesh average particle size (Tyler), in 4 parts of water. Dilute aqueous solutions containing iridium (as chloroiridic acid), and platinum (as chloroplatinic acid), are added and the resultant solution stirred for one hour to assure impregnation of the alumina. The solids are then separated from the solution by filtration and dried in a circulating air oven at about 220° F; and then calcined in an inert atmosphere of nitrogen for 3 hours at 1,000° F. The platinum-iridium catalyst is then heated to 930° F. in a flowing stream of pure hydrogen. The catalyst, which contains 0.3 weight percent platinum and 0.3 weight percent iridium, as metallic metal, is then cooled, in the absence of air, to ambient conditions. The crystallite size of metal hydrogenation-dehydrogenation components, as determined by X-ray analysis, is well dispersed, showing no agglomerates as large as 50A, or greater.

The catalyst is then packed as a fixed bed in one of several hydroforming reactors and contacted with a typical naphtha having the following inspections:

| ASTM Distillation | |
|---|---|
| Initial | 224 |
| 10 | 232 |
| 20 | 234 |
| 30 | 238 |
| 40 | 241 |
| 50 | 244 |
| 60 | 249 |
| 70 | 253 |
| 80 | 262 |
| 90 | 277 |
| Final B.P. | 347 |
| Octane No., RON Clear | 55 |
| Gravity, °API | 57.4 |
| Sulfur, Wt. PPM | 0.1 |
| Analysis, Vol. Percent | |
| Paraffins | 43 |
| Naphthenes | 49 |
| Aromatics | 8 |

The hydroforming reactor is operated at the following on-oil conditions to produce a $C_5^+$ liquid gasoline product of 102 RON clear which, from the beginning of the run to the end of the run, lasts for approximately 6 months.

| Major Process Conditions | |
|---|---|
| Temperature, °F. (Average) | 900°F. |
| Pressure, Psig | 225 |
| Space Velocity, W/Hr./W | 2.0 |
| Hydrogen Rate, SCF/Bbl. | 5000 |

At the end of a run, the flow of feed to the unit is discontinued and the reactor containing the bed of platinum-iridium catalyst is purged with nitrogen to remove residual hydrocarbons. The reaction coke, amounting to about 1–2 weight percent based on the total catalyst, is burned from the catalyst in situ by injecting initially about 0.3 volume percent oxygen in nitrogen into the reactor while maintaining an 810° F. flame front temperature, and then over a period of 24–36 hours increasing the oxygen concentration on the gas to 1.0 volume percent oxygen and continuing the burn at a temperature of 750° F. for a total time of 4–6 hours, after which time the catalyst, which contains a residual of about 0.10 weight percent coke, is found by X-ray analysis to be about 30 percent agglomerated, i.e., 30 percent of the iridium is present as agglomerates (containing both iridium and iridium oxide) of greater than 50A particle size diameter.

One portion of the agglomerated platinum-iridium catalyst is then impregnated with a sufficient amount of an iron salt to provide a catalyst containing 0.3 weight percent platinum, 0.3 weight percent iridium and the desired amount of iron, e.g., 0.5 weight percent iron, as metallic metal, the preparation being conducted as follows: 250 weight parts of the agglomerated platinum-iridium catalyst is impregnated with, e.g., 9.3 weight parts of ferric nitrate, $Fe(NO_3)_3 \cdot 9H_2O$, the iron salt being dissolved with stirring, for one-half hour, in deionized water to which 2 weight parts oxalic acid is added. Sufficient additional deionized water is added to dilute the solution and to impregnate the catalyst by incipient wetness. The catalyst is then dried in a circulating air oven at 265° F. for 4 hours. It is then slowly heated to 1,000° F. in a nitrogen atmosphere and calcined at 1,000° F. for 3 additional hours. The catalyst is then cooled to ambient conditions.

A second portion of the agglomerated platinum-iridium catalyst is impregnated with the desired amount of bismuth to form a 0.3 weight percent platinum, 0.3 weight percent iridium and, e.g., 0.66 weight percent bismuth catalyst, as follows: 175 weight parts of the agglomerated platinum-iridium catalyst is added to 135 weight parts of a dilute nitric acid solution containing 2.5 weight parts of bismuth at incipient wetness. The bismuth impregnated platinum-iridium catalyst is dried overnight at 265° F., and then calcined for 2 hours at 1,000° f. under nitrogen.

In each of the several runs described in the examples below, an inconel reactor is charged with three separate fixed beds of the above-described catalysts, the entry and exit beds being charged for control purposes with a partially agglomerated platinum-iridium catalyst (0.3% Pt/0.3% Ir) while the middle bed, the bed used for the present demonstrations, is charged with a platinum-iridium catalyst, and a platinum-iridium catalyst additionally containing iron or bismuth, in specific concentration hereafter defined.

The examples following show the effectiveness of iron and bismuth, added to the platinum-iridium catalyst, in promoting redispersion of iridium agglomerates, when dispersion is effected, by an initial prereduction with hydrogen, and by contact of the agglomerated catalyst, in a single cycle treatment to the point of chlorine breakthrough, with a moist chlorine-oxygen containing nitrogen gas at 930° F., and at a pressure of 100 psig. The responsiveness to redispersion of an agglomerated platinum-iridium catalyst to such treatment is thus compared to the responsiveness of similarly agglomerated catalysts which contain iron, or bismuth, in addition to platinum and iridium, the agglomerated composition, in terms of the percent iridium and iridium oxide, being given at the entry, mid-portion and exit sides of the middle bed of the reactor at the time of chlorine breakthrough. Percent agglomeration is measured by X-ray analysis.

EXAMPLE 1

A platinum, iridium-on-alumina catalyst (0.3 Wt. % Pt, 0.3% Ir), containing 30 percent of the iridium as agglomerates of iridium oxide greater than 50A (X-ray), is treated with a hydrogen gas mixture, and subsequently with a moist chlorine gas mixture. Thus, the catalyst is first treated with a gaseous mixture of 100 percent hydrogen saturated with water for 48 hours at 930° F. The hydrogen is then purged from the beds with nitrogen. The beds of reduced catalysts are then treated to the point of chlorine breakthrough with a gaseous mixture of 0.13 percent chlorine and 0.13 percent oxygen in nitrogen at 930° F. A platinum, iridium, iron-on-alumina catalyst (0.3 Wt. % Pt, 0.3 Wt. % iridium, 0.5 Wt. % iron), 30 percent agglomeration is similarly treated. The results are given in Table I, below:

TABLE I

Treat Conditions: 5000 ppm water
0.13% $Cl_2$/0.13% $O_2$ in $N_2$
930°F.
100 psig

| | Starting Material | Entry | | Middle of Bed | | Exit Side of Bed | |
|---|---|---|---|---|---|---|---|
| Catalyst | Ir + $IrO_2$ | Ir | $IrO_2$ | Ir | $IrO_2$ | Ir | $IrO_2$ |
| 0.3% Pt, 0.3% Ir | 30 | 19 | 21 | 27 | 17 | 16 | 24 |
| 0.3% Pt, 0.3% Ir, 0.5% Fe | 30 | 17 | 0 | 11 | 0 | — | — |

Percent Agglomeration (Iridium Metal plus Iridium Oxide)

EXAMPLE 2

The foregoing example is repeated, except that the $H_2$ treat lasted 24 hours instead of 48 hours, and bismuth is used rather than iron as a promoter for the platinum-iridium catalyst, with the following results:

TABLE II

Treat Conditions: 5000 ppm water
0.13% $Cl_2$/0.13% $O_2$ in $N_2$
930°F.
100 psig

| | Starting Material | Entry | | Middle of Bed | | Exit Side of Bed | |
|---|---|---|---|---|---|---|---|
| Catalyst | Ir + $IrO_2$ | Ir | $IrO_2$ | Ir | $IrO_2$ | Ir | $IrO_2$ |
| 0.3% Pt, 0.3% Ir | 30 | 19 | 21 | 27 | 17 | 16 | 24 |
| 0.3% Pt, 0.3% Ir, 0.5% Bi | 30 | 18 | 9 | 21 | 0 | 25 | 0 |

Percent Agglomeration (Iridium Metal plus Iridium Oxide)

EXAMPLE 3

This example shows that a platinum-iridium on alumina catalyst which contains iron is more active than a catalyst otherwise similar except that it does not contain iron. Platinum-iridium and platinum-iridium-iron catalysts are thus used to reform a typical virgin naphtha of boiling range 240°-380° F. containing 20 volume percent aromatics, 40 volume percent paraffins and 40 volume percent naphthenes at 900° F., 3 W/W/Hr., and at 150 psig, to provide a gasoline product of 102 RON clear with the following results:

| Catalyst Composition | $C_5^+$ Liquid Selectivity | Relative Activity |
|---|---|---|
| 0.3% Pt/0.3% Ir/0.7% Fe | 79.0 LVS | 565 |
| 0.3% Pt/0.3% Ir | 79.0 LVS | 305 |

This demonstration presents comparisons between a platinum-iridium catalyst and platinum-iron catalysts, the runs being conducted at 925° F., 1.1 W/W/Hr., and 200 psig using a virgin naphtha of boiling range 210°-350° F., which contains 12 volume percent aromatics, 62 volume percent paraffins and 26 volume percent naphthenes. The runs are carried out under identical conditions with differences in catalyst activity determined by differences in percent aromatics in the product (related to RON), as follows:

| Catalyst | Wt. % Aromatics in $C_5^+$ | Relative Activity |
|---|---|---|
| 0.3% Pt/0.3% Ir | 75.5 | 305 |
| 0.3% Pt/0.1% Fe | 59.4 | 83 |
| 0.3% Pt/1.0% Fe | 51.0 | 55 |

Having described the invention, what is claimed is:

1. A process for improving the octane quality of naphtha which comprises contacting said naphtha in an on-oil portion of an operating cycle at reforming conditions with a catalyst composite including a porous inorganic oxide support, halogen in concentration ranging from about 0.1 to about 2 percent, platinum in concentration ranging from about 0.05 to about 3 percent, iridium in concentration ranging from about 0.05 to about 3 percent, and iron or bismuth in concentration ranging from about 0.5 to about 5 percent, based on the total weight of the catalyst, and in a subsequent portion of an operating cycle, burning off deposited coke with an oxygen-containing gas, and activating the catalyst by contact with halogen.

2. The process of claim 1 wherein the catalyst composite contains from about 0.6 to about 1.5 percent halogen, from about 0.1 to about 0.6 percent platinum, from about 0.15 to about 0.3 percent iridium, and from about 0.5 to about 2 percent iron or bismuth.

3. The process of claim 1 wherein the porous inorganic oxide support is alumina.

4. The process of claim 1 wherein reforming is conducted at temperatures ranging from about 600° F. to about 1,050° F., at pressures ranging from about 50 psig to about 750 psig, at space velocities ranging from about 0.1 to about 25 W/Hr./W, and at hydrogen rates ranging from about 1,000 to about 10,000 SCF/Bbl.

5. The process of claim 4 wherein temperatures range from about 850° F. to about 1,000° F., pressures range from about 100 psig to about 250 psig, space velocities range from about 1.0 to about 5.0 W/W/Hr., and the hydrogen rate ranges from about 2,000 to about 5,000 SCF/Bbl.

* * * * *